United States Patent [19]

Hall, III et al.

[11] Patent Number: 5,000,277
[45] Date of Patent: Mar. 19, 1991

[54] HYDROSTATIC STEERING CONTROL FOR A TRACKED VEHICLE

[75] Inventors: Arthur Hall, III, Cicero; James A. Redelman, Indianapolis, both of Ind.

[73] Assignee: General Motors Corporation, Detroit, Mich.

[21] Appl. No.: 444,083

[22] Filed: Nov. 30, 1989

[51] Int. Cl.⁵ .................. B62D 11/06; B62D 5/06
[52] U.S. Cl. ....................... 180/6.44; 74/732.1; 180/6.2; 180/141
[58] Field of Search .............. 60/437; 74/731.1, 732.1, 74/733.1; 180/6.2, 6.3, 6.48, 141, 142, 143, 6.44; 192/0.02 R, 0.048, 0.075, 0.076, 0.096

[56] References Cited

U.S. PATENT DOCUMENTS

| | | | |
|---|---|---|---|
| 2,336,911 | 12/1943 | Zimmermann | 60/437 |
| 4,116,291 | 9/1978 | Brungart | 180/6.2 |
| 4,331,208 | 5/1982 | Kolthoff et al. | 180/6.2 |
| 4,768,635 | 9/1988 | Sakurai et al. | 192/0.076 |

Primary Examiner—David M. Mitchell
Assistant Examiner—Martin Gerich
Attorney, Agent, or Firm—Mark A. Navarre

[57] ABSTRACT

A hydrostatic steering arrangement and control having the high speed steering capability of an output-driven system and the low speed steering capability of an input-driven system. The engine drives the vehicle through a fluid coupling and a multiple ratio hydraulic transmission, and the hydrostatic pump of the steering system is driven by the output (turbine) of the fluid coupling. Increased steering capability at vehicle speeds which would otherwise limit the steering capability, is achieved by controllably slipping the active torque transmitting device of the transmission. In this mode, the hydrostatic pump speed is permitted to increase, and the steering system operates essentially as though it were input-driven.

8 Claims, 1 Drawing Sheet

HYDROSTATIC STEERING CONTROL FOR A TRACKED VEHICLE

The invention herein described was made in the course of work under a contract or subcontract thereunder with the Department of the Army.

This invention relates to the control of a hydrostatic steering system in a tracked vehicle.

BACKGROUND OF THE INVENTION

Hydrostatic drives are commonly employed on tracked vehicles for steering control. The hydrostatic pump is driven by the engine or vehicle, and its displacement is adjusted to control the output speed of the hydrostatic motor, which in turn, steers the vehicle.

In input-driven systems, the hydrostatic pump is driven directly by the vehicle engine, ahead of any uncoupling device such as a fluid coupling or torque transmission device. The advantage of this arrangement, at least when the fluid coupling is unlocked, is that the steering capability is largely independent of the vehicle speed. At higher vehicle speeds, a clutch is applied to directly couple or lock-up the rotating elements of the fluid coupling, locking the engine (and hence pump) speed to the vehicle speed.

In output-driven systems, the hydrostatic pump is driven by the output of the uncoupling devices, such as by the transmission output shaft. Here, the steering capability is directly linked to the vehicle speed, independent of the engine speed. Thus, the output-driven arrangement provides adequate steering capability at medium or higher vehicle speeds even though the engine has stalled or is at idle, but reduced steering capability at low vehicle speeds. Engine overload and stalling is avoided, at least when the fluid coupling is unlocked, due to the fluid coupling isolation.

SUMMARY OF THE INVENTION

The present invention is directed to an improved hydrostatic steering arrangement and control having the high speed steering capability of an output-driven system and the low speed steering capability of an input-driven system. According to this invention, the engine drives the vehicle through a fluid coupling and a multi-ratio transmission, and the hydrostatic pump of the steering system is driven by the output (turbine) of the fluid coupling. Increased steering capability at vehicle speeds which would otherwise limit the steering capability, is achieved by controllably slipping the active torque transmitting device of the transmission. In this mode, the hydrostatic pump speed is permitted to increase, and the steering system operates essentially as though it were input-driven.

In operation, the steering input of the operator corresponds to a requested steering radius, and the steering controller converts the requested radius to a commanded ratio of output or vehicle speed to hydrostatic motor speed, No/Nm. If the fluid coupling is locked, the hydrostatic pump speed is directly linked to the vehicle speed, and the actual output speed No is divided by the ratio No/Nm to generate a speed command for the hydrostatic motor. The pump displacement, in turn, is regulated to bring the actual speed of the hydrostatic motor into correspondence with the commanded speed. This control is also employed with an unlocked fluid coupling if the engine throttle setting is less than a relatively low threshold or the hydrostatic pump is not at full displacement.

However, if the fluid coupling is unlocked, the engine throttle setting exceeds the threshold and the hydrostatic pump is at full displacement, the actual hydrostatic motor speed Nm is multiplied by the ratio No/Nm to generate a speed indication for the output of the transmission. The fluid engagement pressure supplied to the active torque transmitting device (clutch) of the transmission, in turn, is regulated in accordance with the error between the actual and indicated output speeds. As a result, the clutch slips, allowing the engine to drive the hydrostatic pump and motor at a speed in excess of the normal vehicle speed related value. This provides increased low speed steering capability similar to that of an input-driven steering arrangement.

DETAILED DESCRIPTION OF THE DRAWINGS

Figure 1:
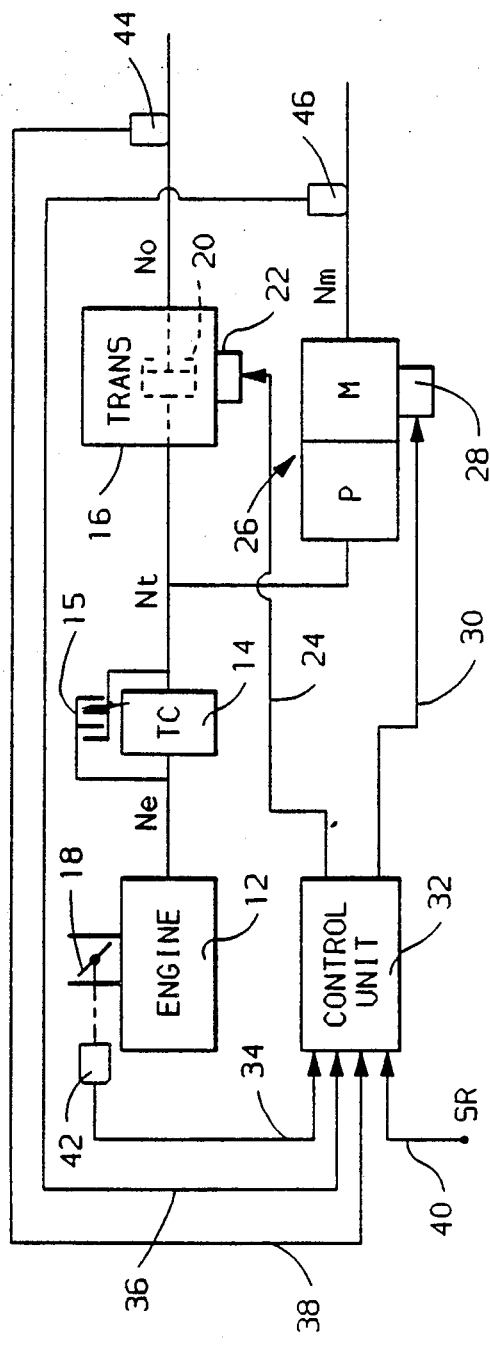
FIG. 1 is a system diagram depicting the powertrain elements and a control unit for regulating transmission clutch pressure and hydrostatic pump displacement in accordance with this invention.

Referring to FIG. 1, the reference numeral 10 generally designates the powertrain of a tracked vehicle, including an engine 12 connected to drive the vehicle through the series combination of a fluid coupling or torque converter (TC) 14 and a multiple speed ratio hydraulic transmission 16. The engine power output is controlled by an operator positioned throttle 18, and has an output shaft speed Ne. The torque converter 14 includes input (pump) and output (turbine) members adapted to be locked together for mutual rotation by a torque converter clutch 15, the output or turbine speed being designated as Nt. The transmission 16 includes one or more fluid operated range clutches 20 for transmitting engine output torque to the vehicle drive elements, and a pressure control device 22 for controlling the torque capacity of the clutch 20 by regulating the pressure of the fluid supplied thereto in accordance with a control signal on line 24. The transmission output shaft speed is designated as No.

A hydrostatic steering unit 26 includes a variable displacement hydrostatic pump P driven by the output or turbine of torque converter 14 and a hydrostatic motor M fluidically coupled to the hydrostatic pump P. The hydrostatic motor M provides a rotary steering input to the vehicle, at a speed designated as Nm. A displacement control device 28 regulates the pump displacement in response to a control signal on line 30.

The control unit 32 receives inputs representative of the engine throttle position %T, the transmission output and hydrostatic motor speeds No and Nm, and the operator steering request SR on lines 34–40. The throttle signal on line 34 is obtained with a conventional position transducer 42 linked to the throttle 18, and the output and motor speed signals on lines 36 and 38 are obtained with conventional speed pick-ups 44 and 46. In response to these inputs, the control unit 32 generates control signals on lines 24 and 30 for the transmission clutch pressure control device 22 and the hydrostatic pump displacement control device 28 for carrying out the steering request SR.

Figure 2:
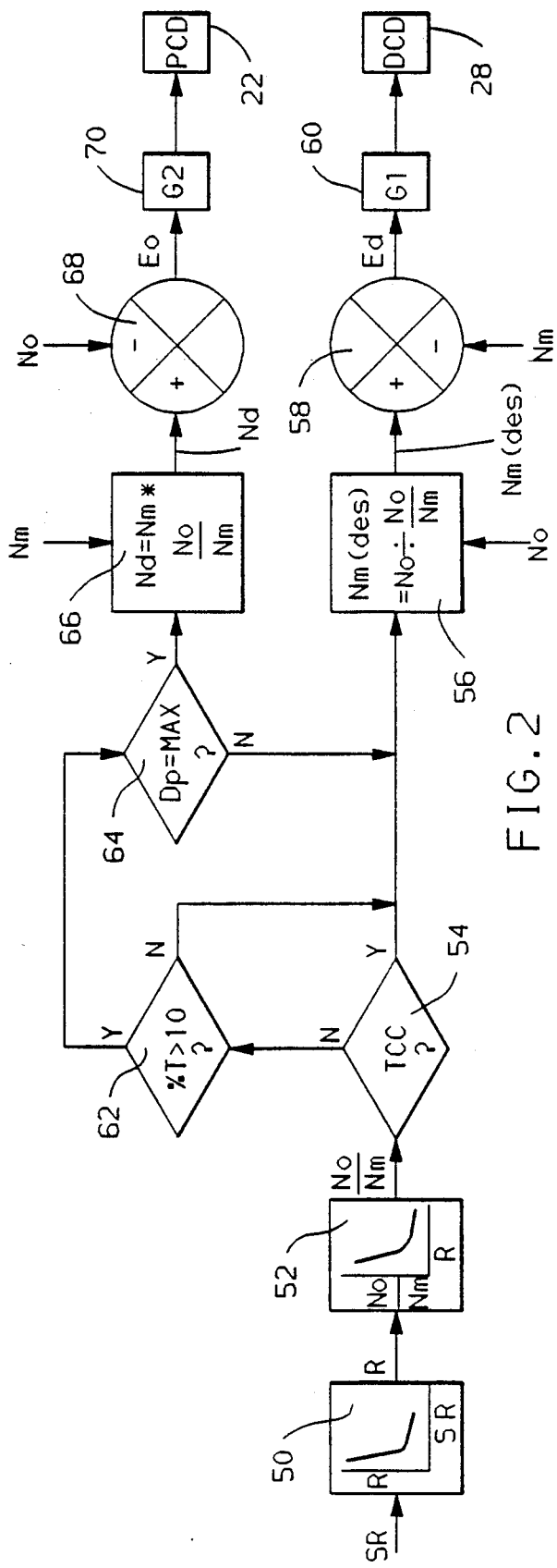
FIG. 2 is a control system diagram for the control unit of FIG. 1.

The functional nature of the control performed by the control unit 32 is illustrated in the control system diagram of FIG. 2, where the pressure control device 22 for the transmission clutch 20 is designated by the block PCD, and the displacement control device 28 for the hydrostatic steering unit 26 is designated by the block DCD. The operator steering request SR is applied to the block 50 which generates a requested turning radius R. The requested turning radius R, in turn, is applied to the block 52 which generates an output-to-motor speed ratio No/Nm for achieving the requested turning radius.

If the torque converter clutch (TCC) 15 is engaged to lock the torque converter 14 (block 54), the output speed is sufficiently high to adequately drive the end hydrostatic unit 26, and the block 56 is executed to divide the measured output speed (line 38) by the output-to-motor speed ratio No/Nm. This yields a desired hydrostatic motor speed Nm(des), which is compared with the measured motor speed (line 36) at summing junction 58 to provide an error signal Ed. The error signal Ed is multiplied by a gain factor G1 (block 60), and applied to line 30 to control the pump displacement control device DCD. This control is also employed with an unlocked torque converter if (1) the engine throttle setting (%T) is less than 10% (block 62) to avoid engine overloading or stalling due to a severe steering request, or (2) the hydrostatic pump is at less than full displacement (block 64).

If the torque converter 14 is unlocked, the engine throttle setting is greater than 10% and the hydrostatic pump is at full displacement, the block 66 is executed to multiply the measured motor speed (line 36) by the output-to-motor speed ratio No/Nm. This yields a transmission output speed indication Nd which is compared with the measured transmission output speed (line 38) at summing junction 68 to provide an error signal Eo. The error signal Eo is multiplied by a gain factor G2 (block 70), and applied to line 24 to control the clutch pressure control device PCD.

In operation, a positive error signal Eo causes the pressure control device PCD to reduce the fluid pressure supplied to clutch 20. As a result, the clutch slips, allowing the engine 12 to drive the hydrostatic pump at a higher speed without affecting the transmission output speed No. The higher pump speed results in a higher motor speed Nm, which in turn, reduces the error signal Eo.

While this invention has been described in reference to the illustrated embodiment, various modifications will occur to those skilled in the art, and it will be understood that systems incorporating such modifications may fall within the scope of the present invention which is defined by the appended claims.

The embodiments of the invention in which an exclusive property or privilege is claimed are defined as follows:

1. A vehicle drive including a fluid coupling having an input and an output, an engine for driving said input in accordance with a variable power setting, a transmission having a variable capacity torque transmitting device connected between said output and a vehicle drive mechanism, and a hydrostatic steering mechanism adapted to receive a rotary input for steering said vehicle in accordance with operator demand, the improvement wherein:

the rotary input for the hydrostatic steering mechanism is obtained from the output of the fluid coupling, so that the steering mechanism may be driven by the vehicle through the vehicle drive mechanism and torque transmitting device substantially independent of the engine power setting when the vehicle speed is relatively high; and the torque capacity of said torque transmitting device is selectively reduced when the vehicle speed is relatively low to permit the engine to drive the steering mechanism through the fluid coupling at a higher rate substantially independent of the vehicle speed, thereby to improve the capacity of the steering system at such relatively low vehicle speeds.

2. In a vehicle having a fluid coupling, an engine for driving an input of the fluid coupling in accordance with a variable power setting, a variable capacity torque transmission device connected between an output of said fluid coupling and a vehicle drive mechanism, a hydrostatic steering system comprising:

hydrostatic means including variable displacement pump means connected to be driven by the output of the fluid coupling and motor means variably coupled to said pump means in accordance with an operator steering request, whereby the pump means can be driven through the vehicle drive mechanism and torque transmission device substantially independent of the engine power setting when the vehicle speed is relatively high; and control means for selectively initiating a torque capacity control of said torque transmission device when the vehicle speed is relatively low, thereby allowing the engine to increase the drive speed of said pump means without affecting the vehicle speed through controlled slippage of said torque transmission device.

3. The steering system set forth in claim 2, wherein:
said control means includes pump control means for regulating the displacement of said pump means to satisfy the operator steering request, and torque control means for initiating said torque capacity control when the pump control means cannot satisfy the operator steering request.

4. The steering system set forth in claim 3, wherein:
the vehicle includes a selectively engageable lock-up clutch connected between the input and output of said fluid coupling; and
initiation of said torque capacity control by said torque control means is inhibited when said lock-up clutch is engaged.

5. The steering system set forth in claim 3, wherein:
the initiation of said torque capacity control by said torque control means is inhibited when the power setting of said engine is lower than a threshold below which the steering system may overload the engine.

6. The steering system set forth in claim 3, wherein:
the operator steering request corresponds to a desired output speed value for the motor means; and
the torque control means, when initiated, regulates the torque capacity of the torque transmission device, allowing such device to slip as required to bring the output speed of the motor means into correspondence with the desired output speed value.

7. The steering system set forth in claim 3, wherein:
the operator steering request is expressed in terms of a ratio No/Nm of the vehicle speed to the requested output speed for the motor; and the torque control means includes means for developing a vehicle speed indication Nd in accordance with the product of said ratio No/Nm and a measure of the actual output speed of the motor means, means for generating an error signal according to the difference between the indicated vehicle speed Nd and the actual vehicle speed No, and means for regulating the torque capacity of the torque transmission device in accordance with the error signal to effect a controlled slippage of the same, thereby allowing the engine to increase the drive speed of said pump means for satisfying said ratio No/Nm without increasing the vehicle speed.

8. In a vehicle having a fluid coupling, an engine for driving an input of the fluid coupling in accordance with a variable power setting, a variable capacity torque transmission device connected between an output of said fluid coupling and a vehicle drive mechanism, a hydrostatic steering system comprising:

hydrostatic means including variable displacement pump means connected to be driven by the output of the fluid coupling and motor means variably coupled to said pump means in accordance with an operator steering request, whereby the pump means can be driven through the vehicle drive mechanism and torque transmission device substantially independent of the engine power setting when the vehicle speed is relatively high;

means for generating a steering command ratio No/Nm in relation to the operator steering request, when No is the vehicle speed and Nm is the desired output speed of the motor means;

pump control means for controlling the displacement of said pump means to satisfy said steering command ratio, based on a measure of the actual speed of the vehicle; and transmission control means effective after the pump control means has fully displaced the pump means for (1) developing a vehicle speed indication Nd based on the product of said steering command ratio No/Nm and a measure of the actual speed of said motor means, and (2) controlling the torque capacity of said torque transmission device in accordance with the difference between the developed vehicle speed indication Nd and said measure of the actual vehicle speed, thereby to effect a controlled slippage of such device which allows the engine to increase the drive speed of said pump means for satisfying said steering command ratio without directly affecting the vehicle speed.

* * * * *